US 6,682,253 B2

(12) United States Patent
Binna et al.

(10) Patent No.: US 6,682,253 B2
(45) Date of Patent: Jan. 27, 2004

(54) ASSEMBLY RAILED FORMED OUT OF AT LEAST ONE PROFILE ELEMENT

(75) Inventors: Michael Binna, Bottrop (DE); Beate Görtz, Jülich (DE); Andreas Hanke, Leichlingen (DE); Renate Neumann, Düsseldorf (DE); Georg Kirchner, Solingen (DE)

(73) Assignee: Halfen GmbH & Co. KG, Langenfeld-Richrath (DE)

( * ) Notice: Subject to any disclaimer, the term of this patent is extended or adjusted under 35 U.S.C. 154(b) by 0 days.

(21) Appl. No.: 10/114,349

(22) Filed: Apr. 2, 2002

(65) Prior Publication Data
US 2002/0114659 A1 Aug. 22, 2002

Related U.S. Application Data

(63) Continuation of application No. PCT/EP00/09624, filed on Sep. 30, 2000, now abandoned.

(30) Foreign Application Priority Data

Oct. 7, 1999 (DE) .................................... 299 17 734 U

(51) Int. Cl.[7] .................................................. F16B 9/00
(52) U.S. Cl. ....................... 403/263; 403/382; 211/182; 211/191; 52/732.1; 52/653.2
(58) Field of Search ..................... 411/84, 85; 403/256, 403/257, 260, 261, 263, 381, 382, 403, 373, 374.1, 374.2, 374.3, 374.4; 211/182, 190, 191, 207; 52/730.1, 732.1, 653.2

(56) References Cited

U.S. PATENT DOCUMENTS

| 4,238,550 A | | 12/1980 | Burgess et al. | |
|---|---|---|---|---|
| 4,358,887 A | * | 11/1982 | Creps | |
| 5,012,938 A | * | 5/1991 | King | 211/191 |
| 5,326,204 A | | 7/1994 | Carlson et al. | |
| 5,584,624 A | | 12/1996 | De Voursney | |
| 5,605,239 A | | 2/1997 | DeVoursney et al. | |
| 5,628,598 A | * | 5/1997 | Hofle | 411/970 X |
| 5,669,260 A | | 9/1997 | Stampfl | |
| 5,704,571 A | | 1/1998 | Vargo | |
| 5,876,165 A | * | 3/1999 | Campbell | 410/43 |

FOREIGN PATENT DOCUMENTS

FR  2 673 051  8/1992

* cited by examiner

Primary Examiner—Lynne H. Browne
Assistant Examiner—Michael P. Ferguson
(74) Attorney, Agent, or Firm—Gudrun E. Huckett

(57) ABSTRACT

An assembly rail has at least one profile element with support legs. A rail slot is defined between the support legs and extends in a longitudinal direction of the at least one profile element. The support legs are oriented inwardly toward an interior of the at least one profile element. A hollow profile that is larger than the at least one profile element has edge strips arranged along at least one longitudinal side of the hollow profile. Between the edge strips a receiving slot is formed. The at least one profile element is arranged in the receiving slot and is connected fixedly to the hollow profile. The rail slot of the at least one profile element opens outwardly.

20 Claims, 7 Drawing Sheets

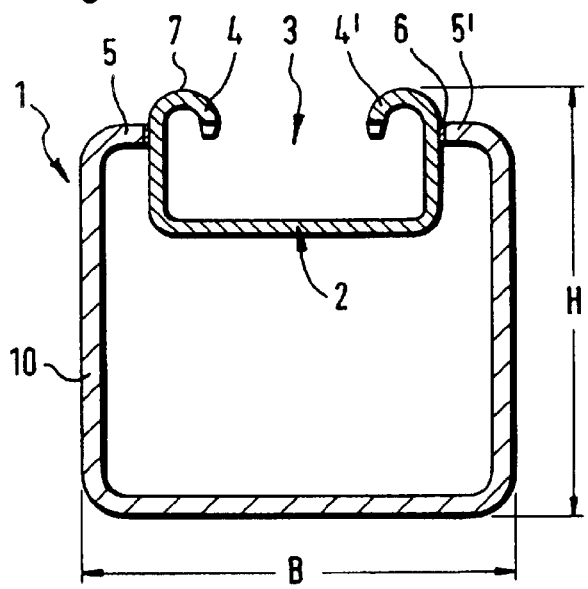
Fig. 5
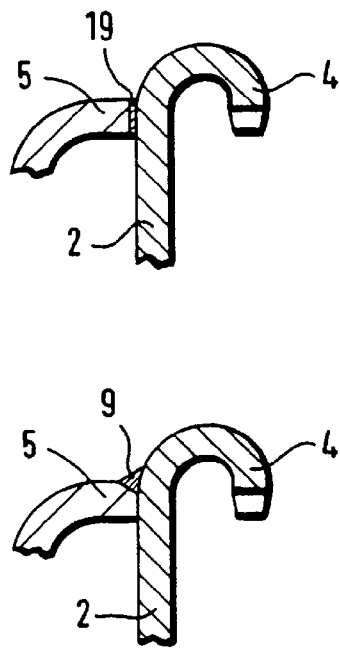
Fig. 6
Fig. 7
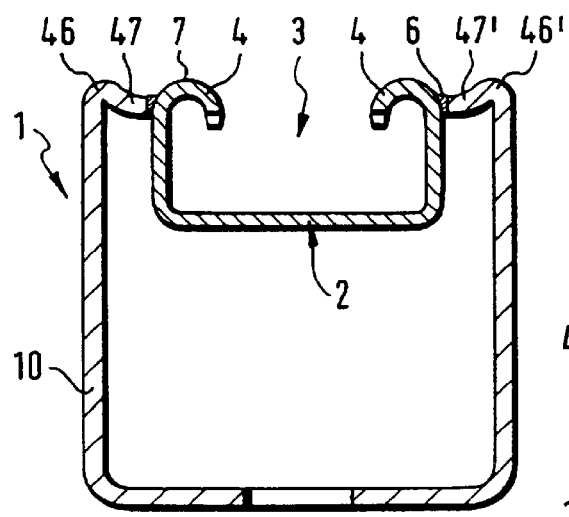
Fig. 8
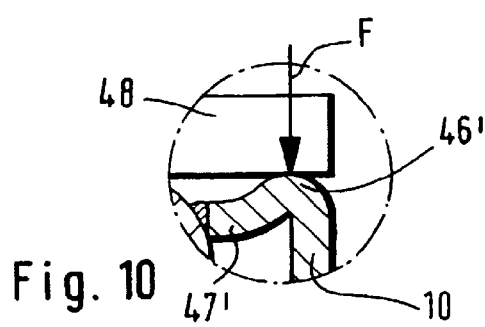
Fig. 10
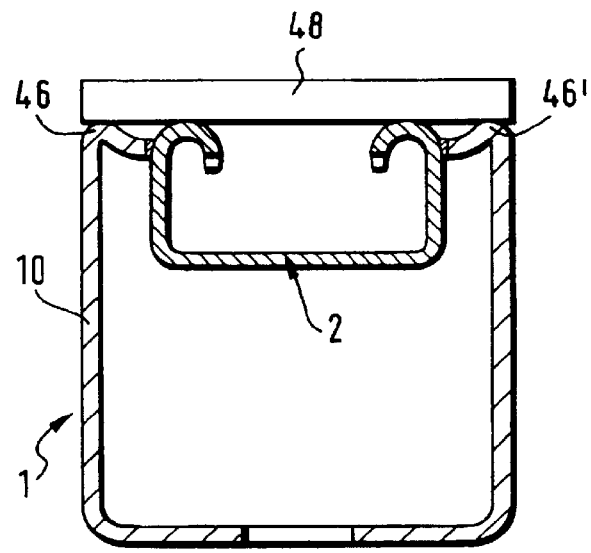
Fig. 9

ASSEMBLY RAILED FORMED OUT OF AT LEAST ONE PROFILE ELEMENT

This is a continuation of International Application PCT/EP00/09624 with an international filing date of Sep. 30, 2000, not published in English under PCT Article 21(2), and now abandoned.

BACKGROUND OF THE INVENTION

1. Field of the Invention

The invention relates to an assembly rail formed out of at least one profile element comprising a rail slot extending along one side in the longitudinal direction of the profile element and comprising inwardly oriented support legs adjacent to the rail slot.

2. Description of the Related Art

U.S. Pat. No. 5,704,571 describes a support construction comprising profile elements to be fastened on walls, ceilings or the like. These profile elements have a rail slot extending along one side in the longitudinal direction of the profile elements, wherein the rail slot is arranged between inwardly oriented support legs extending adjacent to the rail slot. Rungs are fasten on the profile elements and serve for supporting pipes, cables or the like. These rungs are preferably screwed down on the profile elements by means of hammer-head screws. If required, is also possible to connect two profile elements with their backside resting against one another; this increases the fastening possibilities even more.

Such profile elements are known in many different configurations; however, they comprise conventionally the same basic element wherein the parallel extending profile elements are combined to an assembly rail with their longitudinal sides resting against one another. Moreover, it is known to provide the assembly rail with reinforcement plates which are welded areally onto the sidewalls or the back wall of the assembly rail.

In the known types of configurations, depending on the type of use, a differently configured assembly rail is required which thus necessitates a plurality of differently configured assembly rails. Moreover, the connection by screwing of several profile elements of the same type to a desired assembly rail on site represents a considerable mounting expenditure which is often uneconomical for cost reasons. The different shapes which result by combining individual profile elements require often also differently configured connecting elements which must be adapted to the respective use so that stocking of these elements as well as assembly leads to considerable costs.

U.S. Pat. No. 5,605,293 describes in FIG. 3 a rail comprised of a single piece of sheet metal which is bent multiple times in order to provide a C-shaped inner profile and a C-shaped outer profile. The free ends of the deformed sheet metal strip abut at the backside of the outer C-shaped profile and are welded together.

A very similar concept of manufacturing a rail is also described in U.S. Pat. No. 4,238,550 where the unitary rail is also formed by bending a sheet metal strip multiple times and connecting the free ends at the backside of the outer C-shape.

U.S. Pat. No. 5,326,204 discloses in FIG. 2 an inner profile element 62 and an outer hollow profile 60 having free ends 82 and 80 which are bent about the free ends 100 of the profile element 62 so that the rail slot is defined between the ends 82 and 80 of the hollow profile 60.

SUMMARY OF THE INVENTION

It is an object of the present invention to provide an assembly rail of the aforementioned kind which can be universally employed.

In accordance with the present invention, this is achieved in that the profile element is arranged in a receiving slot, formed in a longitudinal side between edge strips of a hollow profile larger than the profile element, and is fixedly connected thereto, wherein the rail slot of the profile element is oriented outwardly.

The assembly rail is extremely torsion-proof and comprises, in comparison to the known configurations, a substantially increased load-bearing capacity. Special constructive measures for additionally reinforcing the assembly rail, as needed in known profile elements, is not required in the case of the assembly rail of the present invention. A further advantage is seen in that the outer contour of the assembly rail is independent of the shape and size of the profile element. As a result of the closed rail configuration, the outer dimensions of the frame construction can be constructed of larger sizes as compared to the open C-rails because the inventive closed shape prevents the risk of torsional-flexural buckling. It is thus possible to create greater lengths of the assembly rail as a result of the improved stability behavior of the closed profile.

According to an advantageous embodiment of the invention, the profile element is received such in the hollow profile that the side of the profile element where the rail slot is provided is flush with the mantle surface of the hollow profile. As an alternative, it is also possible to arrange the profile element such in the hollow profile that the respective side with the rail slot projects past the contour of the mantle surface of the hollow profile. In this connection, this projecting length is relatively small, generally $\leq 5$ mm.

According to a further embodiment of the invention, the profile element is connected with the edge strips of the hollow profile by material bonding (soldering, welding or the like). In order for the stability to be identical about the entire length of the assembly rail, it is furthermore advantageous to weld the profile element about its entire length to the edge strips. An advantageous welding method in this connection is laser welding or weld cladding by using powders. As alternatives for material bonding methods, other connecting technologies are also usable, for example, jointing or gluing.

In order for the connecting elements to be mountable independent of the respective direction, i.e., on each of the four sides of the profile, it is expedient that the hollow profile, which is larger in comparison to the profile element, has a cross-section that is at least approximately square. In this connection, the assembly rail, relative to the side of the profile element where the rail slot is provided, can have a height which corresponds to the width of the hollow profile. In this way, connecting elements can also be universally configured and always match the assembly rail independent of their position. The profile element in the assembly rail can have different shapes without this having an effect on the outer contour of the hollow profile. For example, it is possible to use profile elements with a flat cross-sectional shape or profile elements with a greater depth. The hollow profile can be comprised of two identical lateral elements forming receiving slots on two oppositely positioned sides of the hollow profile; in each one of the receiving slots a profile element is arranged. This forms a twin rail or double rail whose mounting possibilities are even more universal.

It is also possible to produce the profile element as well as the surrounding hollow profile of a material with identical wall thickness. However, it is also considered to be expedient to provide the profile element with a somewhat smaller wall thickness than the hollow profile. The assembly rail with only one profile element can be provided with openings, preferably for receiving attachment elements, basically on all sides, including the profile element bottom. The openings are particularly round holes or slotted holes; however, other shapes of openings are possible also. The assembly rail, i.e., the profile element as well as the hollow profile, can be made of steel, wherein it is expedient to protect the material against corrosion. The corrosion protection can be applied by or in the form of the following measures: hot galvanizing; duplex steel; coatings of lacquer or paint; or Sendzimir galvanizing. As an alternative to this, it is also possible to employ stainless steel for the profile element and the hollow profile.

BRIEF DESCRIPTION OF THE DRAWING

In the drawing:

FIG. 5 shows an assembly rail with a projecting profile element and having identical height and width;

FIG. 6 shows a first example for a welding seam configuration;

FIG. 7 shows a second example for a welding seam configuration;

FIG. 8 shows a variant of the embodiment of FIG. 1;

FIG. 9 shows an assembly rail according to FIG. 8 with contact plate;

FIG. 10 shows an enlarged detail of the support action in FIG. 9;

DESCRIPTION OF THE PREFERRED EMBODIMENTS

Figure 1:
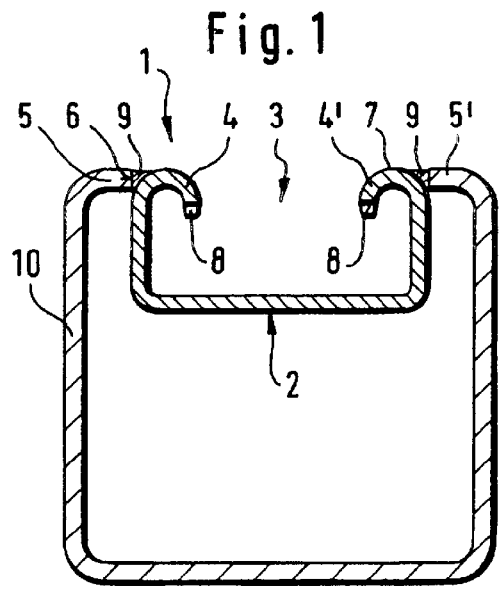
FIG. 1 shows a section of an assembly rail transverse to its longitudinal direction.

FIG. 1 shows an assembly rail 1 in cross-section. In the illustrated embodiment, the assembly rail 1 has a hollow profile 10 with a cross-section that is at least approximately square. The edge length of the square can be, for example, approximately 60 mm; however, other dimensions are also possible. At the upper edge of the hollow profile 10 of FIG. 1, between the edge strips 5 and 5', which are oriented toward one another, a receiving slot 6 is formed in which a profile element 2 is arranged. The profile element 2 has a rail slot 3 at its outwardly facing side 7. The rail slot 3 extends in the longitudinal direction of the profile element 2 and is delimited at its longitudinal sides by inwardly oriented support legs 4, 4'. The support legs 4, 4' are provided with toothings 8 at the edges located within the interior defined by the contour of the profile element 2. The outer side 7 of the profile element 2 is flush with the outer contour of the hollow profile 10 wherein a connection 9 in the form of an adhesive or a welding seam is arranged in a gap formed between the profile element 2 and the edge strips 5, 5', respectively, as a result of contour of the profile element 2. The wall thickness of the profile element 2 is approximately 2.5 mm, while the wall thickness of the hollow profile 10 is, for example, 3 mm.

Figure 2:
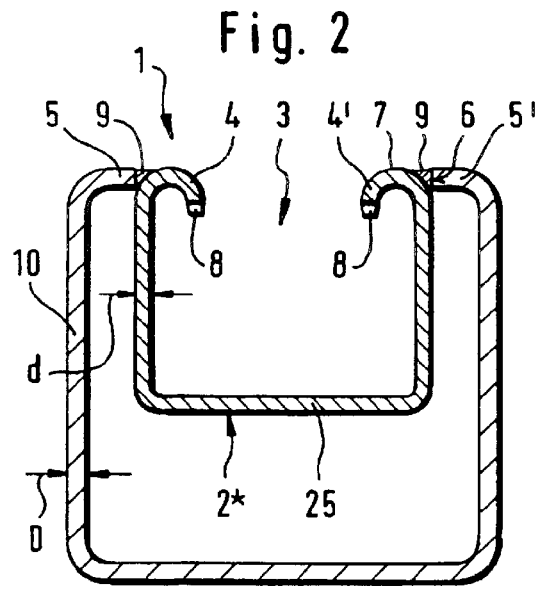
FIG. 2 shows a variant of the embodiment of FIG. 1 with a changed profile element.

FIG. 2 shows a variant of the embodiment of FIG. 1 wherein the assembly rail 1 has a hollow profile 10 which corresponds to that of FIG. 1. A different configuration is only provided for the profile element 2* having a significantly greater depth than the profile element 2 in FIG. 1. The depth of the profile element 2* is such that the distance of the outer side 7 to the back wall 25 is greater than the width of the rail slot 3. Otherwise, the configuration of FIG. 2 corresponds to that of FIG. 1 so that for same parts the same reference numerals as in FIG. 1 are used. Moreover, FIG. 2 shows that the profile element 2* has a constant wall thickness d across its cross-sectional shape. Also, the wall thickness D of the hollow profile 10 is constant. The wall thickness d of the profile element 2* and the wall thickness D of the hollow profile 10 can be identical; it may also be expedient to provide the wall thickness d to be somewhat reduced relative to the wall thickness D.

Figure 3:
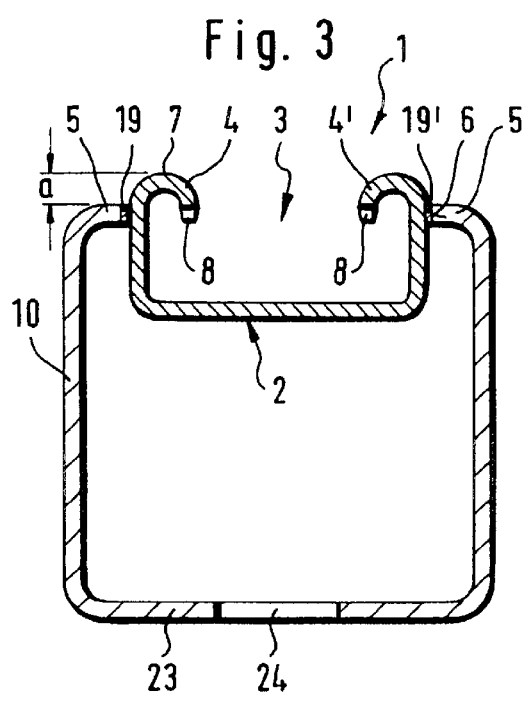
FIG. 3 shows a variant of the embodiment of FIG. 1 with a slightly projecting profile element.

FIG. 3 shows an alternative configuration of the assembly rail 1 in which the profile element 2 with the side 7 having the rail slot 3 projects past the contour of the mantle surface of the hollow profile 10. The outer edge defined by the edge strips 5, 5' of the hollow profile 10 has a spacing a relative to the reference edge defined by the outer side 7 which is, for example, up to 5 mm. However, it is also advantageous to select the spacing a to be smaller. As a result of the different relative position of the profile element 2 between the edge strips 5, 5', the end faces of the edge strips 5, 5' rest completely against the outer side of the profile element 2 and are preferably welded thereto by laser beam so that in this way at this location a welding seam 19, 19' results. On the side 23 which is facing away from the receiving slot 6, openings 24 for receiving fastening means are provided whereby in the illustration FIG. 3 only one such opening 24 is shown which can be, for example, a round hole, a slotted hole or the like.

Figure 4:
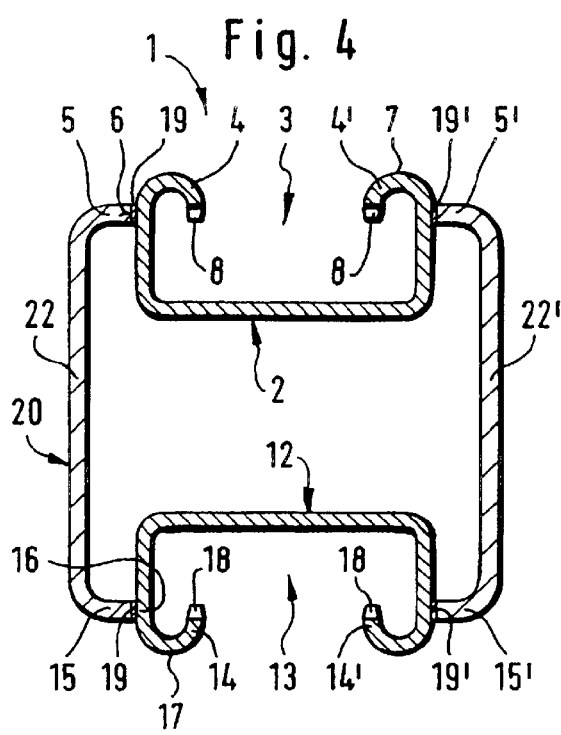
FIG. 4 shows an assembly rail with two profile elements.

FIG. 4 shows an embodiment in which the assembly rail 1 has a hollow profile 20 which is comprised of two lateral elements 22 and 22' as well as profile elements 2 and 12 enclosed therein. These lateral elements 22 and 22' are completely symmetrical and have edge strips 5, 15 and 5', 15' between which the receiving slots 6 and 16 are formed. The lateral elements 22, 22' are arranged mirror-symmetrical to one another and rests with the end faces of the edge strips 5, 15; 5' 15' delimiting the receiving slots 6, 16 against the lateral surfaces of the profile elements 2, 12 and are connected thereto by material bonding, for example, by welding seams 19, 19' which are produced by laser welding. The assembly rail 1 according to FIG. 4 is a twin or double rail because two profile elements 2, 12 are present which have rail slots 3 and 13 facing away from one another. The outer side 7 which serves as a reference edge projects from the outer contour of the hollow profile 20 by the same amount as the outer side 17 of the profile element 12.

FIG. 5 shows an assembly rail 1 which is comprised of the hollow profile 10 having the width B. Between the edge strips 5 and 5' of the hollow profile 10 the profile element 2 is welded such that the outer side 7 of the profile element 2 projects out of the hollow profile 10 to such an extent that the assembly rail has a height H which is identical to the width B. In this way, connecting elements can be universally attached because the connecting spacing is identical on all four sides.

FIG. 6 shows on an enlarged scale a butt-joint welding seam 19 where the welding seam extends over the entire material thickness of the edge strip 5. A laser is preferably used for generating such a welding seam. This connection between the hollow profile 10 and the inwardly positioned profile element 2 enables the greatest possible welding seam depth with which a maximum load-bearing capacity can be achieved. In FIG. 7 the welding seam 9 is a fillet weld.

In the embodiment according to FIG. 8, the hollow profile 10 is provided at the side having the receiving slot 6 with bends 46, 46' of a small radius. These bends 46, 46' extend about more than 90° and are inwardly oriented before they pass over into the edge strips 47, 47' which are oriented toward one another and are inwardly displaced toward the interior of the hollow profile 10 relative to the outer sides of the bends 46, 46'. The profile element 2 is inserted into the hollow profile 10 and fastened therein such that the outer side 7 is flush with the contour of the bends 46, 46'.

It can be seen in FIG. 9 that the assembly rail 1 according to FIG. 8 forms a support for components to be attached on the bends 46, 46' which is achieved by supporting a contact plate 48 on the bends 46, 46'. In this way, independent of the contact of the mounting plate 48 with the profile element 2, the force is introduced directly into the hollow profile 10, in particular, at the support surface formed by the bends 46, 46', as indicated in FIG. 10 by the arrow F. This configuration increases the positive-locking connection in the connecting parts transverse to the longitudinal axis of the rail.

Figure 11:
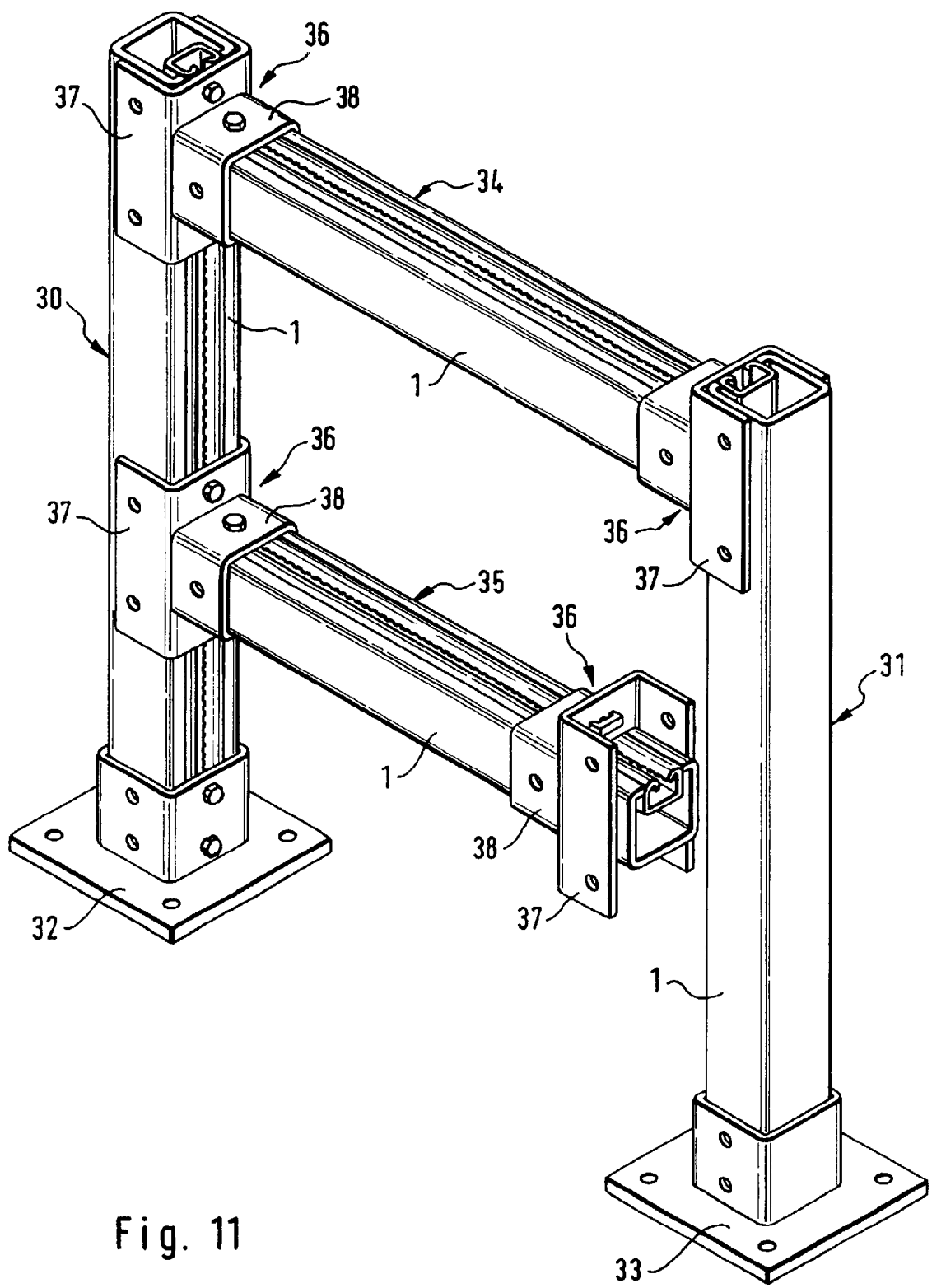
FIG. 11 shows a frame construction formed of assembly rails according to the invention.

FIG. 11 shows a frame construction which is formed of assembly rails 1 according to the invention wherein the lateral supports 30, 31 are formed of assembly rails 1 according to the embodiment of FIG. 1. The lateral supports 30, 31 are provided at their lower ends with support shoes 32, 33. For the attachment of assembly rails serving as transverse beams 34, 35, connecting elements 36 are provided which comprise each a fastening part 37 and a console part 38. The fastening part 37 is substantially U-shaped and engages the assembly rail 1 on three sides, wherein one side must be facing the profile element 2 in the assembly rail 1 of the respective lateral support 30, 31. In the embodiment of FIG. 11, this is the bottom of the U-shape. For connecting the connecting elements 36 with the assembly rails 1 serving as the lateral supports 31, 32, expediently those fastening elements are provided which are described in German utility model 297 14 621 U1. Such fastening means can also be provided for connecting the lateral supports 30, 31 with the support shoes 32, 33.

Figure 12:
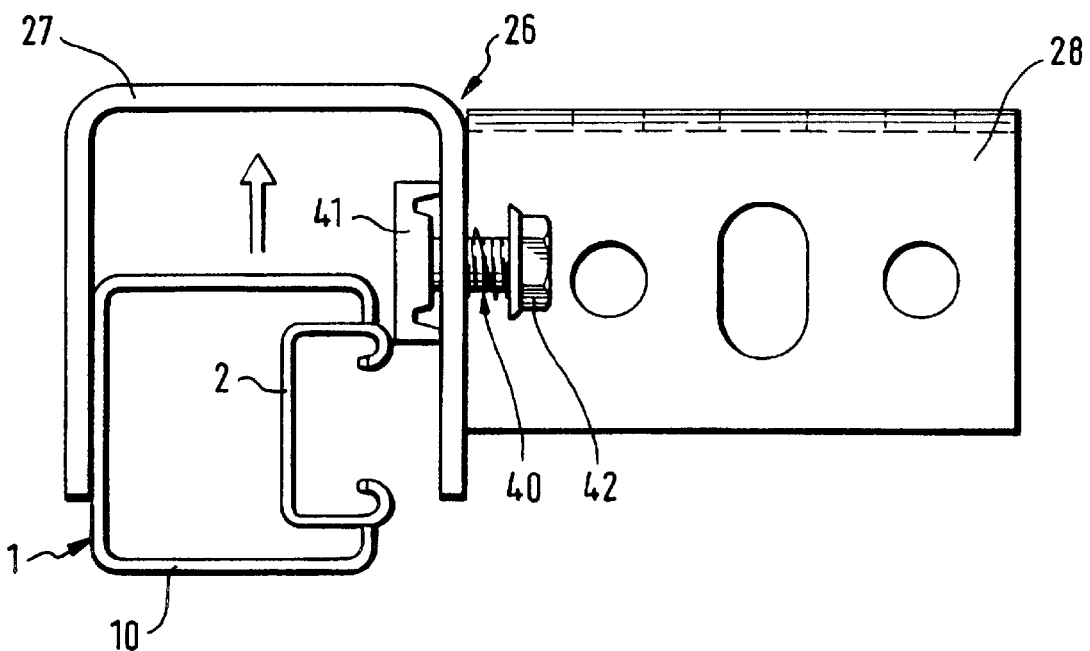
FIG. 12 illustrates the first step of mounting of a connecting element.
Figure 13:
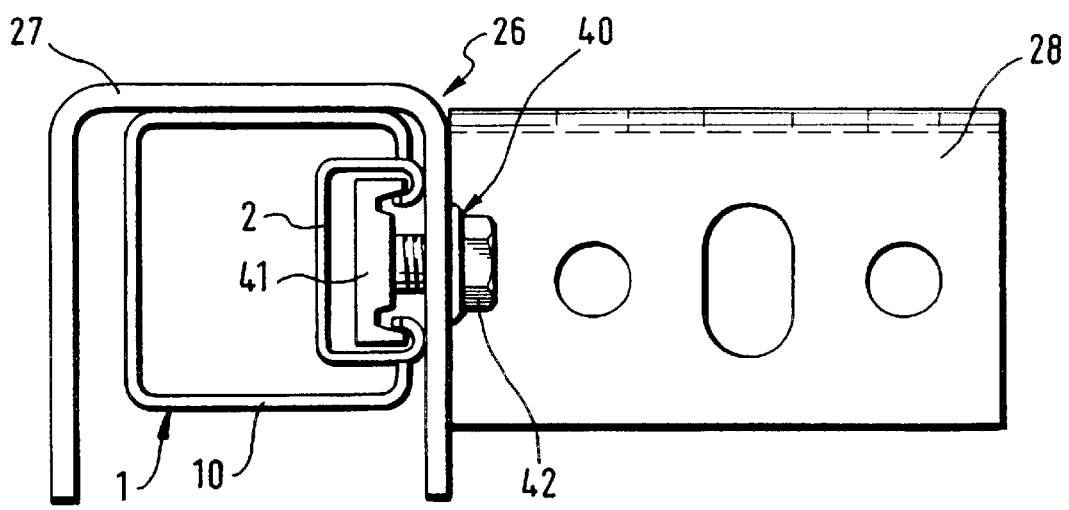
FIG. 13 shows completed mounting of the connecting element.

With the aid of FIGS. 12 and 13 it will be explained in which way connecting elements 26 can be mounted on the assembly rails 1, which are already fixedly connected with their respective ends. According to the embodiment of the connecting element 26, i.e., comprising a console part 28 arranged on one sidewall of the connecting element 27, the connecting element 27 is pushed laterally onto the assembly rail 1 or the assembly rail 1 is inserted into the connecting part 27 relative to the connecting element 26. This is illustrated by the shown arrow. In the inserted state, which is illustrated in FIG. 13, the clamping screw 40 provided on the connecting element 26 can be inserted into the profile element 2 and, upon rotation of the hammer head 41, can be locked behind the support legs 4. A rotation of the clamping nut 42 is required for the final attachment.

Figure 14:
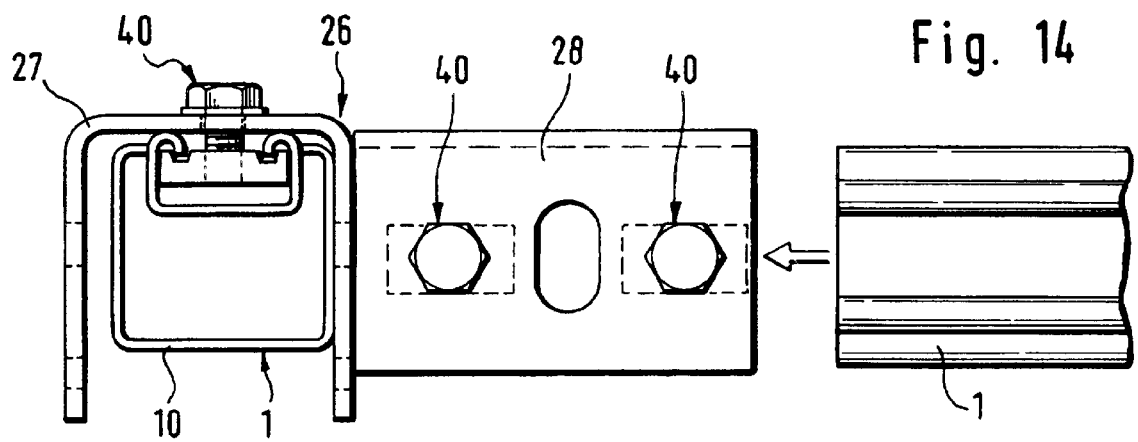
FIG. 14 shows a first position for mounting.

FIG. 14 illustrates that in the case of an assembly rail 1 rotated by 90°, in which the slot 3 of the rail is pointing upwardly, the connecting element 26 can be attached in the same way; however, in this case the clamping screw 40 is provided on the bottom of the U-shaped connecting part 27. Moreover, FIG. 14 shows that a further assembly rail can be connected on the console part 28 which is insertable into the console part 28. The fastening means are preferably again clamping screws 40 of the already described kind.

Figure 15:
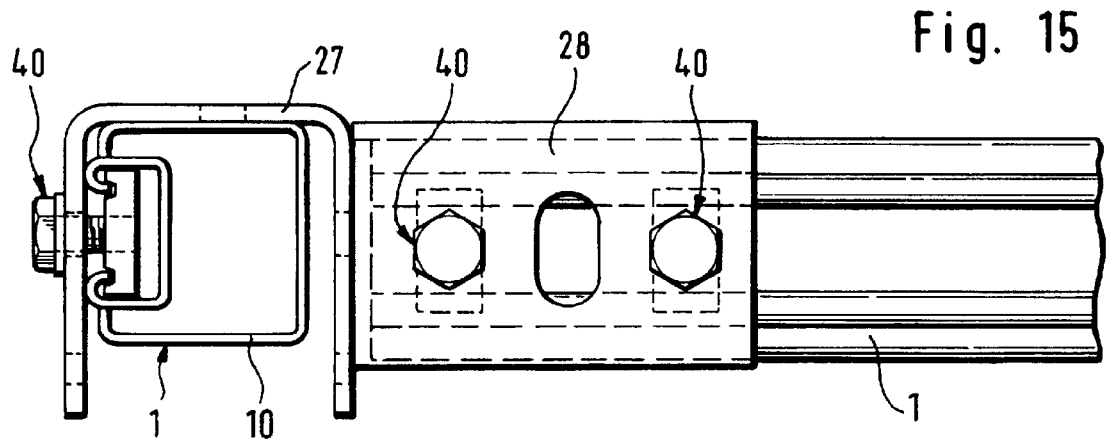
FIG. 15 shows a second position for mounting.
Figure 16:
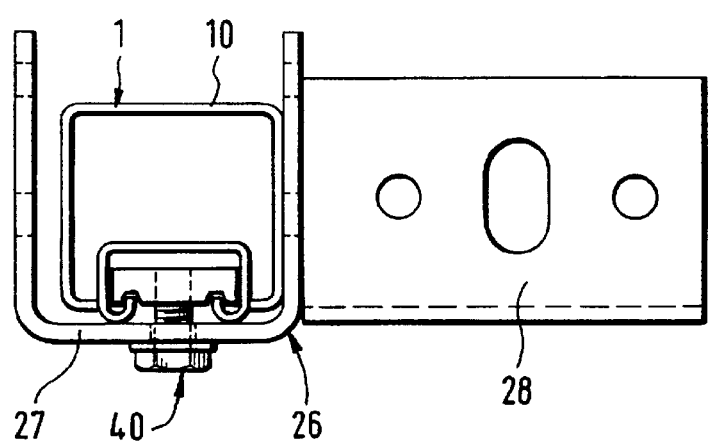
FIG. 16 shows a third position for mounting.

FIGS. 15 and 16 show a fastening possibility wherein according to FIG. 13 the assembly rail 1 is rotated relative to FIG. 13 by 180° and in FIG. 16 it is again rotated by an additional 90°. In this way, the rail slot points downwardly in FIG. 16.

Figure 17:
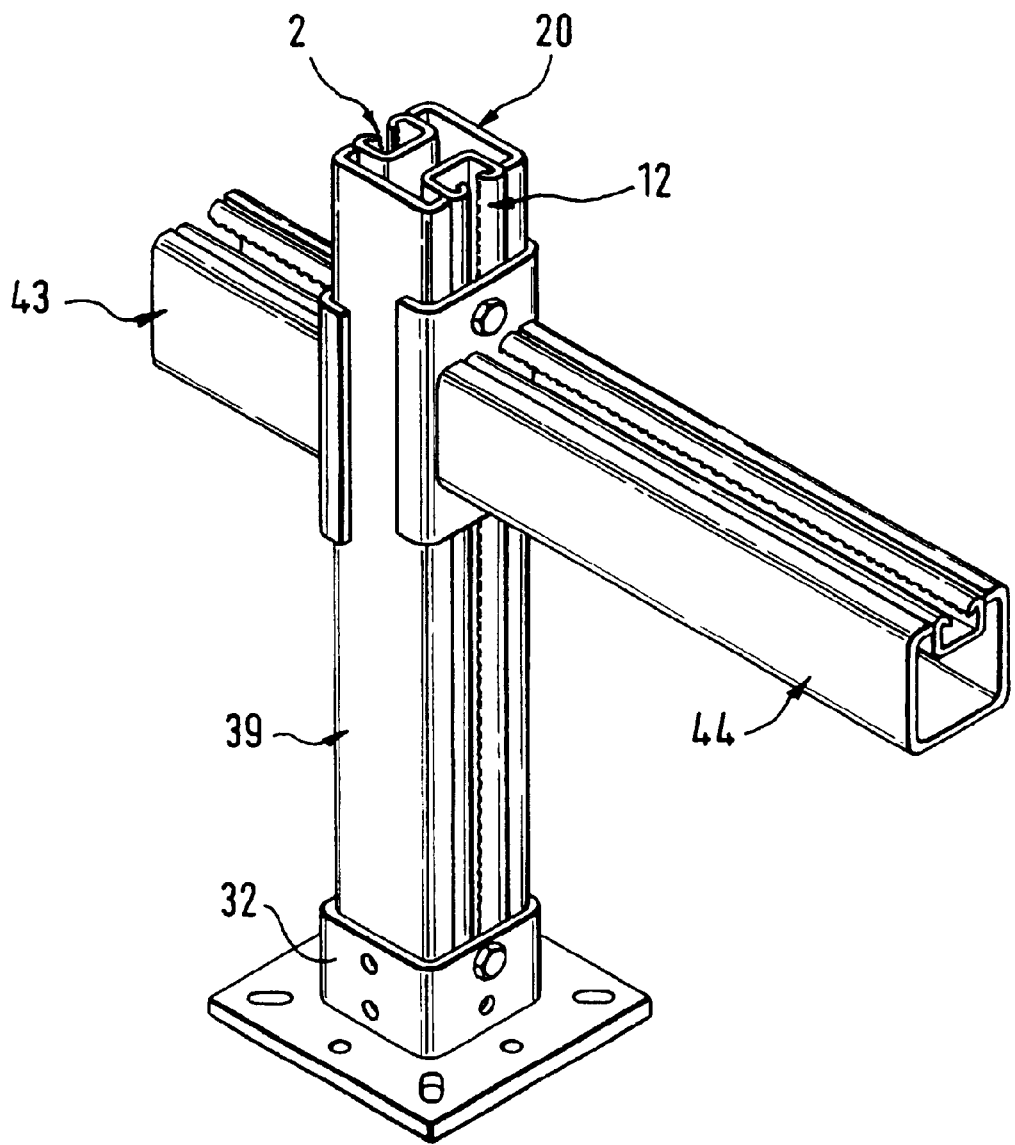
FIG. 17 shows a variant of the embodiment of FIG. 11.

FIG. 17 shows in section a variant of the embodiment of FIG. 11, wherein as a vertical support 39 a hollow profile 20 according to FIG. 4 is provided. This vertical support 39 is again provided with a support shoe 32 in order to attach the vertical support 39 on a ground surface. As a result of the configuration of the vertical support 39 as a double rail, two horizontal transverse beams 43, 44 can be attached at any desired level, in particular, at the same or only slightly differently height, on the vertical support 39.

Figures 18, 19:
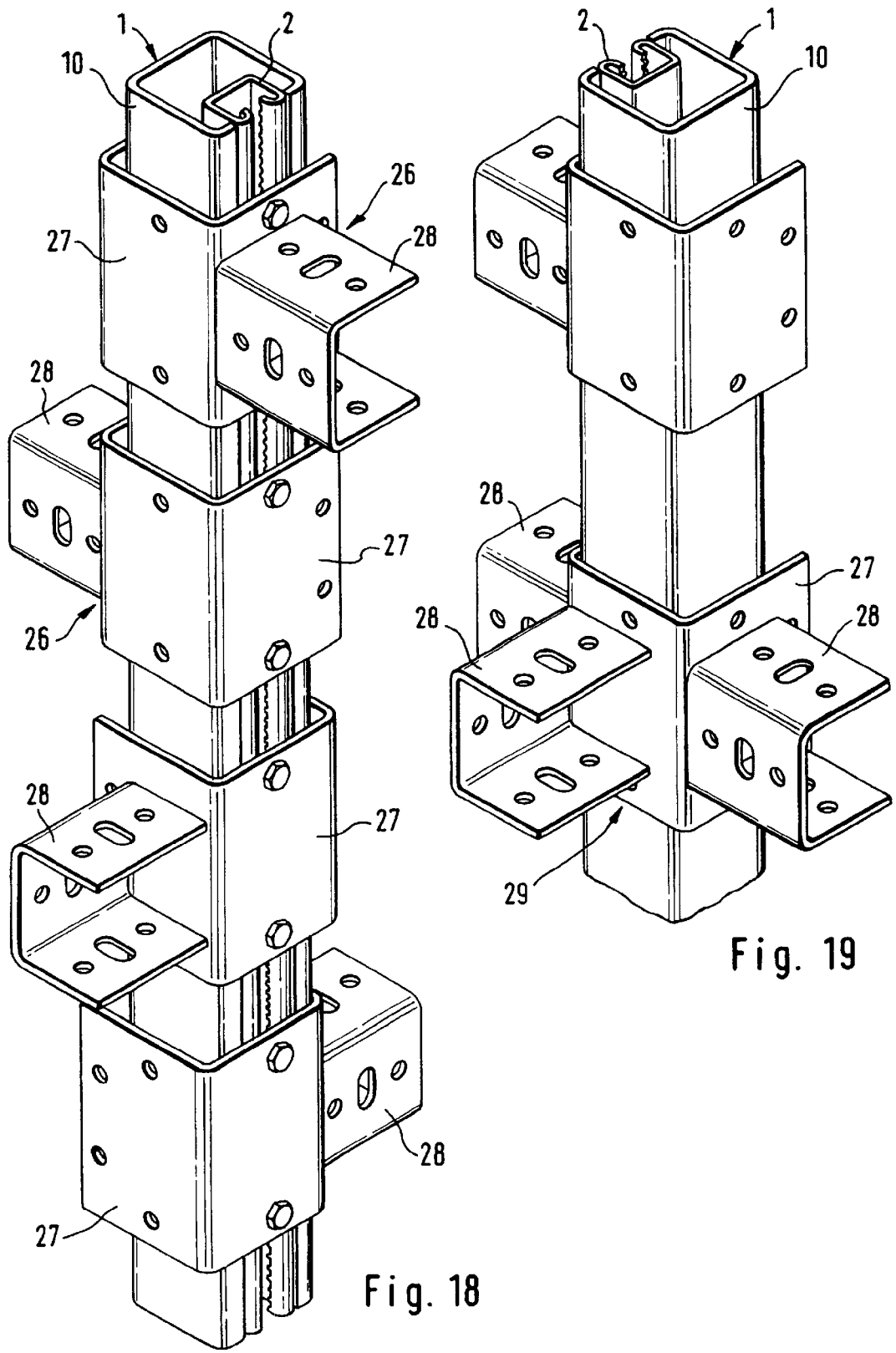
FIG. 18 shows a section of an assembly rail with several connecting elements oriented in different directions.
FIG. 19 shows a variant of the embodiment of FIG. 18 with a T-joint.

FIG. 18 shows a detail of an assembly rail 1 with several connecting elements 26 oriented in different directions. This illustrates that despite the universal configuration of the connecting elements 26 the console parts 28 can project in any of the four directions of the square hollow-profile 10 because the only relevant consideration is in which relative position the connecting part 27 is pushed onto the hollow profile 10.

FIG. 19 illustrates that not only the connecting elements 26 with a simple console part 28 can be mounted on the assembly rail 1 but that also connecting elements 29 can be provided in which the connecting part 27 can support up to three console parts 28. In this way, console parts oriented in different directions can be arranged at the same level without use of a double or twin profile.

The above described invention is characterized not only in that the assembly rail 1 can be employed universally, but that, independent of the shape of the profile elements within the hollow profile, an identical contour for receiving the connecting elements is always made available. This is possible in that, independent of the position of the rail slots, the connecting elements can be pushed on without this causing an unnecessary air gap. The stability of the assembly rail does not depend solely on the profile element but is substantially determined by the entirety of the hollow profile and the profile element which together form a shape-stable frame. With the constructive adaptation of the individual parts relative to one another in relation to the respective load, substantially greater forces, particularly forces that cause primarily torsion, can be introduced into the support system for the same weight and comparable size of the outer contour in comparison to the known arrangements.

The above described system can solve a plurality of known problems in industrial pipeline construction with a minimum of multi-functional components wherein the position of the rail slot of all rails to be connected is of no consequence. The required components enable, independent of the position of the rail slot, the connection in all four directions without the components having to be introduced into the rail end. The possibility of using the components in this way enables the subsequent mounting in already existing configurations in which the rail ends are already fixedly attached. It should be mentioned that the assembly rail according to the invention can also be of a different cross-sectional shape than the square shape, for example, it can be rectangular.

While specific embodiments of the invention have been shown and described in detail to illustrate the inventive principles, it will be understood that the invention may be embodied otherwise without departing from such principles.

What is claimed is:

1. An assembly rail (1) comprising:

at least one U-shaped profile element (2, 2*, 12) having a base and two parallel legs connected to the opposed ends of the base, wherein the two parallel legs each have an upper end distal from the base, respectively, wherein the upper ends are bent inwardly toward an interior of the at least one profile element (2, 2*, 12) and form support legs (4, 4'; 14, 14') having free ends spaced closer together than the two parallel legs;

a rail slot (3, 13) defined between the free ends of the support legs (4, 4'; 14, 14') and extending in a longitudinal direction of the at least one profile element (2, 2*, 12);

a hollow profile (10, 20) larger than the at least one profile element (2, 2*, 12) and having edge strips (5, 5', 15, 15'; 47, 47') arranged along at least one longitudinal side of the hollow profile (10, 20), wherein the edge strips have end faces facing one another and forming therebetween a receiving slot (6,16);

wherein the at least one profile element (2, 2* 12) has a width measured perpendicularly to the two parallel legs matching a width of the receiving slot (6, 16) and is arranged in the receiving slot (6, 16), wherein an exterior side of the two parallel legs is connected fixedly to the end faces of the edge strips (5, 5', 15, 15'; 47, 47') of the hollow profile (10, 20); and wherein the rail slot (3, 13) of the at least one profile element (2, 2*, 12) opens outwardly.

2. The assembly rail according to claim 1, wherein the support legs (4, 4', 14, 14') have an outer side (7, 17) arranged flush with an outer contour of the hollow profile (10, 20).

3. The assembly rail according to claim 2, wherein the at least one longitudinal side is provided with lateral bends (46, 46'), wherein the edge strips (47, 47') adjoin the lateral bends (46, 46') and point toward one another, wherein the edge strips (47, 47') are inwardly displaced relative to the lateral bends (46, 46') in a direction toward an interior of the hollow profile (10, 20) in a direction perpendicular to the longitudinal side.

4. The assembly rail according to claim 1, wherein the support legs (4, 4', 14, 14') have an outer side (7,17) projecting outwardly past an outer contour of the hollow profile (10, 20).

5. The assembly rail according to claim 1, wherein the at least one profile element (2, 2*, 12) is connected by material bonding to the edge strips (5, 5'; 15, 15'; 47,47').

6. The assembly rail according to claim 5, wherein the at least one profile element (2, 2*, 12) is welded along an entire length of the at least one profile element (2, 12) to the edge strips (5, 5'; 15, 15'; 47, 47').

7. The assembly rail according to claim 6, wherein the at least one profile element (2, 2*, 12) is connected by laser welding.

8. The assembly rail according to claim 6, wherein the at least one profile element (2, 2*,12) is connected by weld cladding using a powder.

9. The assembly rail according to claim 1, wherein the at least one profile element (2, 2*, 12) and the edge strips (5, 5'; 15, 15'; 47, 47') are mechanically jointed.

10. The assembly rail according to claim 1, wherein the at least one profile element (2, 2*, 12) is connected by an adhesive to the edge strips (5,5'; 15, 15'; 47,47').

11. The assembly rail according to claim 1, wherein the support legs (4, 4'; 14; 14') have a toothing (8, 18).

12. The assembly rail according to claim 1, wherein the hollow profile (10, 20) has a cross-section that is at least approximately square.

13. The assembly rail according to claim 12, wherein the support legs (4, 4', 14, 14') have an outer side (7) projecting outwardly past an outer contour of the hollow profile (10, 20), wherein the assembly rail (1) has a height, measured relative to the outer side (7), matching a width of the hollow profile (10).

14. The assembly rail according to claim 1, wherein the hollow profile (20) is comprised of two identical lateral elements (22, 22') arranged mirror-symmetrically to one another, wherein the lateral elements (22, 22') are provided with the edge strips having free ends facing one another and wherein between the free ends on oppositely positioned sides of the hollow profile (20) the receiving slot (6, 16) is formed, respectively, wherein each one of the receiving slots (6, 16) has one of the profile elements (2,12) arranged therein.

15. The assembly rail according to claim 1, wherein the at least one profile element (2, 12) has a wall thickness (d) smaller than a wall thickness (D) of the hollow profile (10, 20).

16. The assembly rail according to claim 1, wherein in one or several sides of the hollow profile (10) openings (24) are provided for receiving fastening means.

17. The assembly rail according to claim 16, wherein the openings (24) are round holes or slotted holes.

18. The assembly rail according to claim 1, wherein the at least one profile element (2, 12) and the hollow profile (10, 20) are comprised of steel and wherein the assembly rail is provided with a corrosion protection.

19. The assembly rail according to claim 18, wherein the corrosion protection is selected from the group consisting of a hot galvanized coating; a paint or lacquer coating; and a Sendzimir galvanized coating.

20. The assembly rail according to claim 1, wherein the at least one profile element (2, 12) and the hollow profile (10, 20) are comprised of stainless-steel or duplex steel.

* * * * *